US009052097B2

(12) United States Patent
Blincoe et al.

(10) Patent No.: US 9,052,097 B2
(45) Date of Patent: Jun. 9, 2015

(54) SUPPORT CLIPS FOR LIGHTING FIXTURES

(75) Inventors: Patrick Stephen Blincoe, Kirkville, NY (US); Clifford Randy Helmer, Fulton, NY (US)

(73) Assignee: Cooper Technologies Company, Houston, TX (US)

( * ) Notice: Subject to any disclaimer, the term of this patent is extended or adjusted under 35 U.S.C. 154(b) by 350 days.

(21) Appl. No.: 13/126,716

(22) PCT Filed: Oct. 28, 2009

(86) PCT No.: PCT/US2009/062362

§ 371 (c)(1),
(2), (4) Date: Apr. 28, 2011

(87) PCT Pub. No.: WO2010/051309

PCT Pub. Date: May 6, 2010

(65) Prior Publication Data

US 2011/0211356 A1 Sep. 1, 2011

Related U.S. Application Data

(60) Provisional application No. 61/109,151, filed on Oct. 28, 2008.

(51) Int. Cl.

| | |
|---|---|
| ***B60Q 1/00*** | (2006.01) |
| ***F21V 17/18*** | (2006.01) |
| ***F21V 17/10*** | (2006.01) |
| ***F21V 17/12*** | (2006.01) |

(52) U.S. Cl.

CPC ............... *F21V 17/18* (2013.01); *F21V 17/107* (2013.01); *F21V 17/12* (2013.01)

(58) Field of Classification Search

CPC ........ F21V 17/107; F21V 17/12; F21V 17/18
USPC ........ 362/368, 396, 362, 374, 581; 248/316.7
See application file for complete search history.

(56) References Cited

U.S. PATENT DOCUMENTS

| | | | | |
|---|---|---|---|---|
| 2,614,785 A | 10/1952 | Versen | | |
| 3,422,468 A * | 1/1969 | Schutz | ........................... | 5/259.1 |
| 4,583,340 A | 4/1986 | Sauer | | |
| 4,626,975 A | 12/1986 | Miletich | | |
| 4,905,131 A | 2/1990 | Gary | | |
| 7,160,007 B2 * | 1/2007 | Pan | ............................... | 362/497 |
| 7,175,313 B2 | 2/2007 | Bednara et al. | | |
| 8,109,659 B2 * | 2/2012 | Doubek | ........................ | 362/370 |

* cited by examiner

*Primary Examiner* — Anh Mai
*Assistant Examiner* — Jessica M Apenteng
(74) *Attorney, Agent, or Firm* — King & Spalding LLP

(57) ABSTRACT

Support clips and systems thereof are provided. Support clips include a web, a lower flange, and an upper flange. The lower flange extends from the web orthogonally. The upper flange extends from the web, towards the lower flange, at an angle. The lower flange includes an aperture for receiving a fastener. Systems include support clips of the present invention coupling a ballast housing to a mounting module. The lower flange is secured to the housing, and the upper flange engages the mounting module, such that the housing is supported by the support clip against the mounting module when in a latched position. A user is able to secure a fastener through the support clip aperture and openings in the housing and mounting module without having to use additional hands.

20 Claims, 9 Drawing Sheets

SUPPORT CLIPS FOR LIGHTING FIXTURES

CROSS-REFERENCE TO RELATED APPLICATION

The present application claims priority to U.S. Provisional Patent Application No. 61/109,151, titled "Support Clip For Lighting Fixture," filed on Oct. 28, 2008, the entire disclosure of which is hereby fully incorporated herein by reference.

TECHNICAL FIELD

The present invention relates generally to locking assemblies for lighting fixtures. More particularly, the present invention relates to locking assemblies having support clips for easily securing a ballast tank housing to a mounting module of a lighting fixture.

BACKGROUND OF THE INVENTION

Lighting fixtures having a ballast tank housing are typically used in harsh environments, such as manufacturing plants, chemical and petrochemical processing facilities, and offshore applications, as well as in other areas that require the use of heavy-duty lighting fixtures. The housing can protect the internal components, such as the ballast, from the effects of moisture, dirt, dust, corrosion, vibration, and other harsh conditions to which the lighting fixtures are exposed.

Conventional lighting fixtures include a mounting module, such as a top hat, that is secured to a ceiling, wall, or pole, and a ballast tank housing coupled to the mounting module. During routine maintenance or installation of the lighting fixtures, a user must use one hand to support the ballast tank housing and maintain its position, while the user uses the other hand to tighten a locking screw to secure the housing to the mounting module. In some instances, the housing may weigh up to 50 pounds, which can cause the user some difficulty in supporting the housing and tightening the locking screw. If the user is working from a ladder or other hazardous location, the difficulties in securing the ballast tank housing to the mounting module while attempting to maintain a safe position may pose a safety hazard.

Therefore, a need exists for an improved locking mechanism for securing a ballast tank housing to a mounting module that is quicker, easier, and safer for the user.

SUMMARY OF THE INVENTION

The present invention attempts to satisfy the above-described need by providing support clips for securing a ballast housing to a mounting module. In one embodiment, the support clips of the present invention include a web, a lower flange extending from one end of the web, and an upper flange extending from the opposite end of the web. The lower flange extends orthogonally from the web, and includes an aperture for receiving a fastener, such as a bolt. The aperture is cylindrical shaped and includes threads disposed in the interior of the aperture. The upper flange extends at an angle towards the lower flange. The angle is in the range from about 15 degrees to about 60 degrees between the upper flange and the web. In certain aspects, the upper flange includes gripping means, such as serrations, for engaging a mounting module. The intersection between the lower flange and the web is radially curved, stepped, or recessed. The intersection between the upper flange and the web is radially curved, stepped, or recessed.

In another embodiment, a lighting fixture has a support clip secured to a ballast housing and a mounting module. The lighting fixture includes the housing having an extension having a first opening, the a mounting module having an extension having a second opening, and a support clip. The lower flange of the support clip is coupled to the housing extension. In a latched position, the upper flange of the support clip engages the mounting module extension, thus supporting the weight of the housing. A fastener is positioned within the aperture of the lower flange and the first opening. The fastener may be tightened, such that the second opening receives the fastener, thus securing the ballast housing to the mounting module. The support clip disengages the mounting module upon the fastener securing the housing to the mounting module.

In yet another embodiment, a lighting fixture has a support clip secured to a ballast housing. The lighting fixture includes the housing having an extension having a first aperture, and a support clip. The lower flange of the support clip includes a second aperture. The lower flange is coupled to the housing extension such that the first aperture is aligned with the second aperture. A fastener is positioned within the second aperture of the lower flange and the first aperture of the housing extension.

The features of the present invention will be readily apparent to those skilled in the art upon a reading of the description of the preferred embodiments that follows.

DETAILED DESCRIPTION OF EXEMPLARY EMBODIMENTS

The present invention provides locking assemblies having support clips for simpler, easier installation and maintenance of lighting fixtures having a ballast tank housing to be secured to a mounting module. The support clip can allow a user to secure the housing to the mounting module without requiring use of both hands.

Figure 1A:
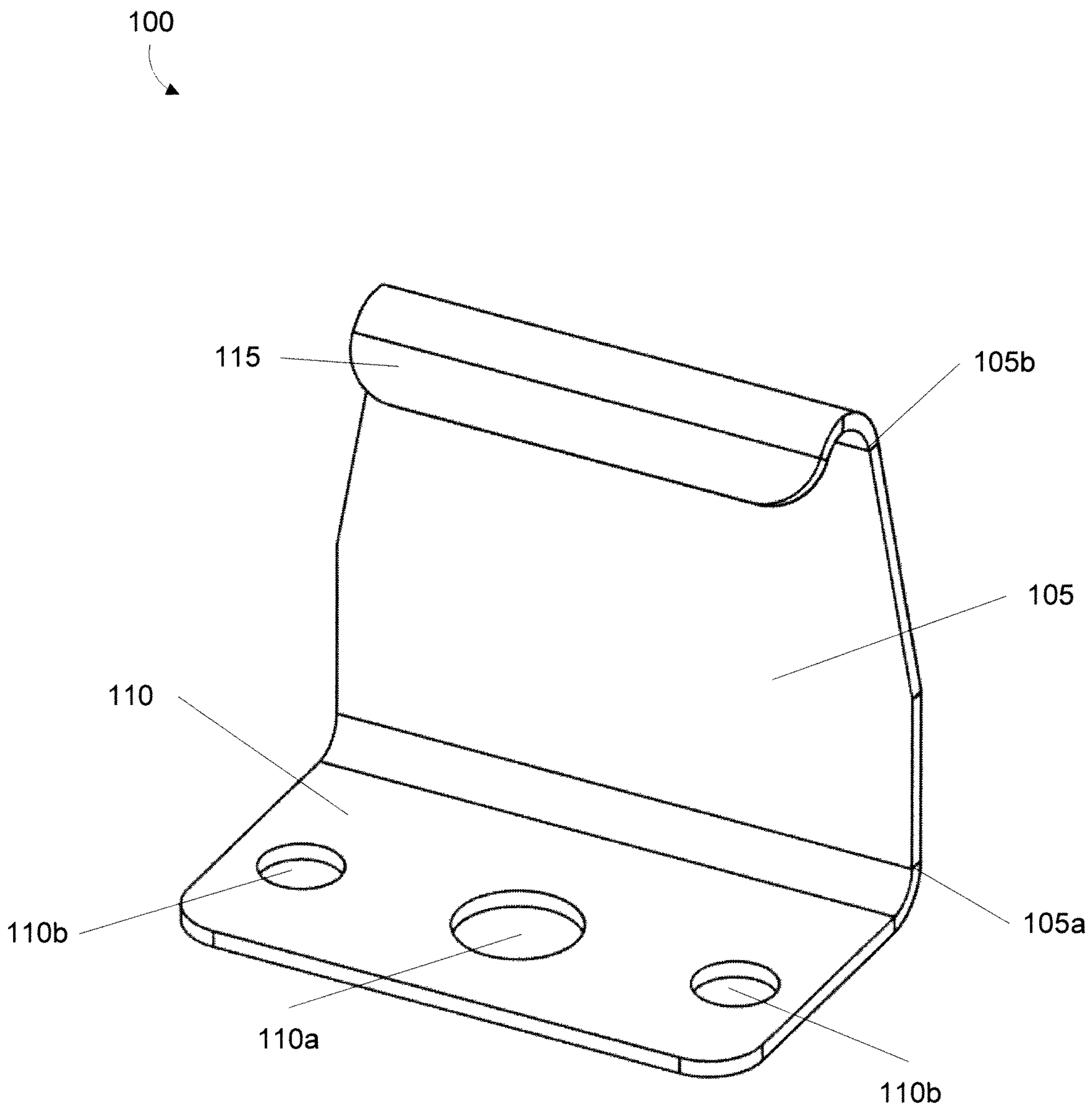
FIG. 1A is a top perspective view of a support clip, according to an exemplary embodiment.

FIG. 1A is a top perspective view of a support clip 100, according to an exemplary embodiment of the present invention. The support clip 100 comprises a web 105, a lower flange 110, and an upper flange 115. The lower flange 110 extends from a lower end 105*a* of the web 105. The upper flange 115 extends from an upper end 105*b* of the web 105, where the upper end 105*b* is opposite the lower end 105*a*.

Figure 5A:
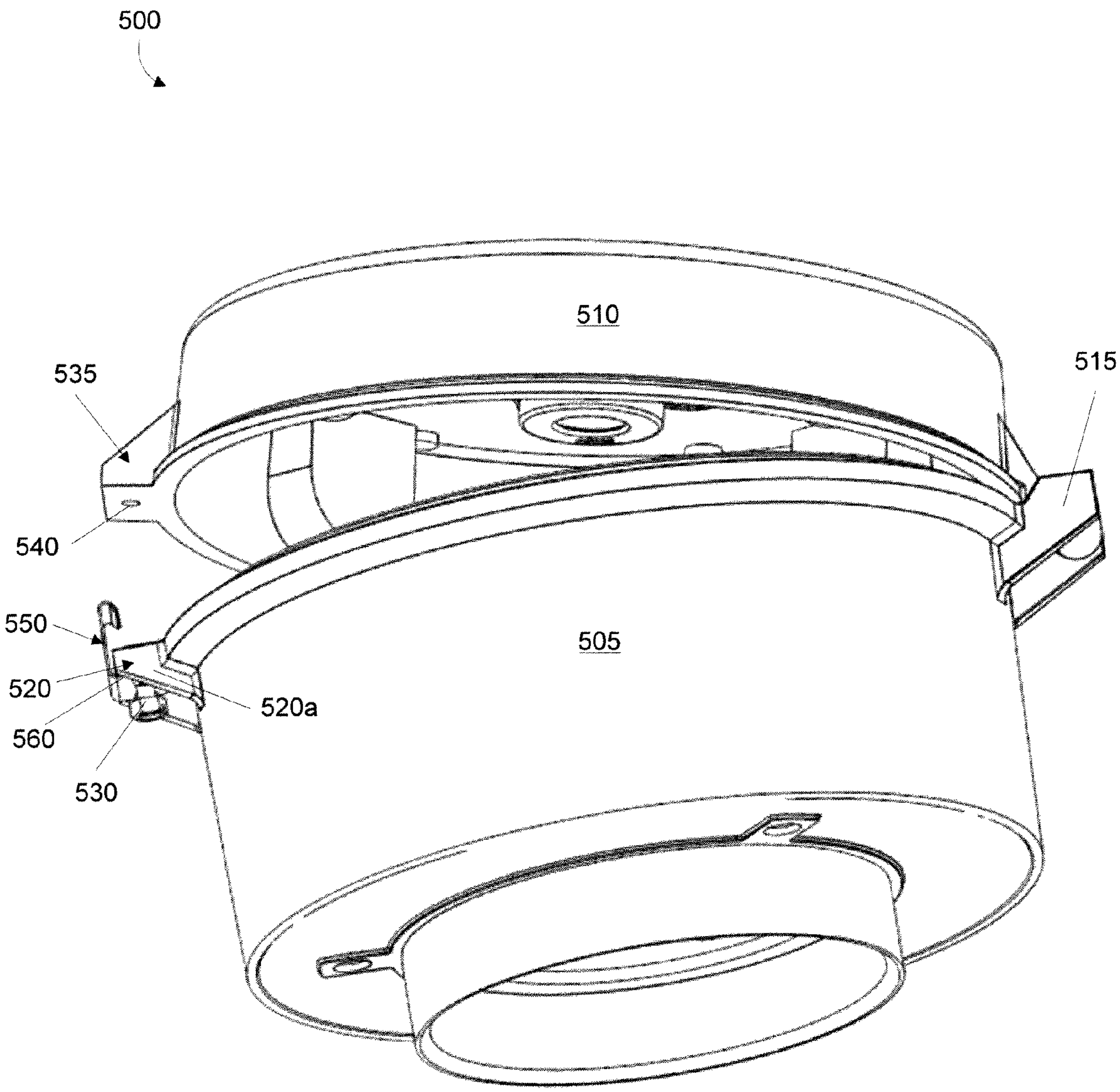
FIG. 5A is a perspective view of a support clip coupled to a ballast tank housing to be secured to a top hat, according to an exemplary embodiment.
Figure 5B:
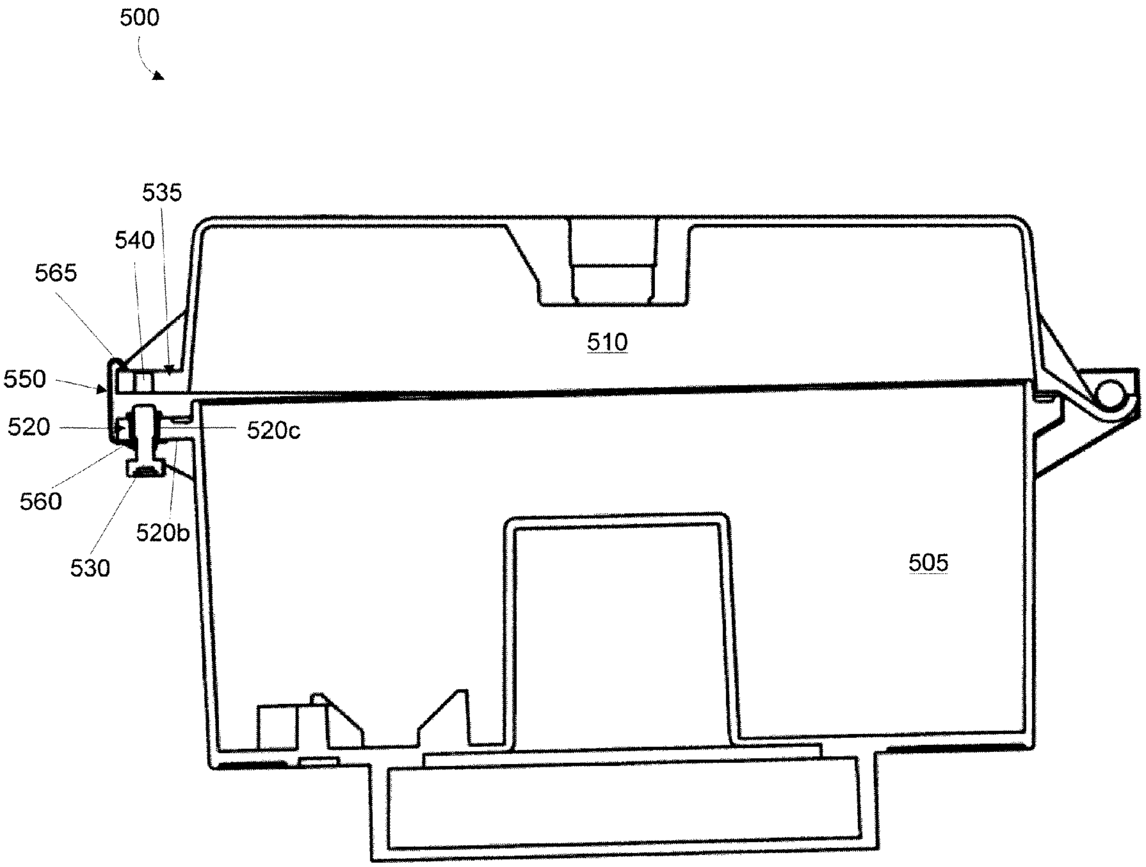
FIG. 5B is a side cross-sectional view of the support clip coupled to the ballast tank housing and the top hat of FIG. 5A, according to an exemplary embodiment.
Figure 5C:
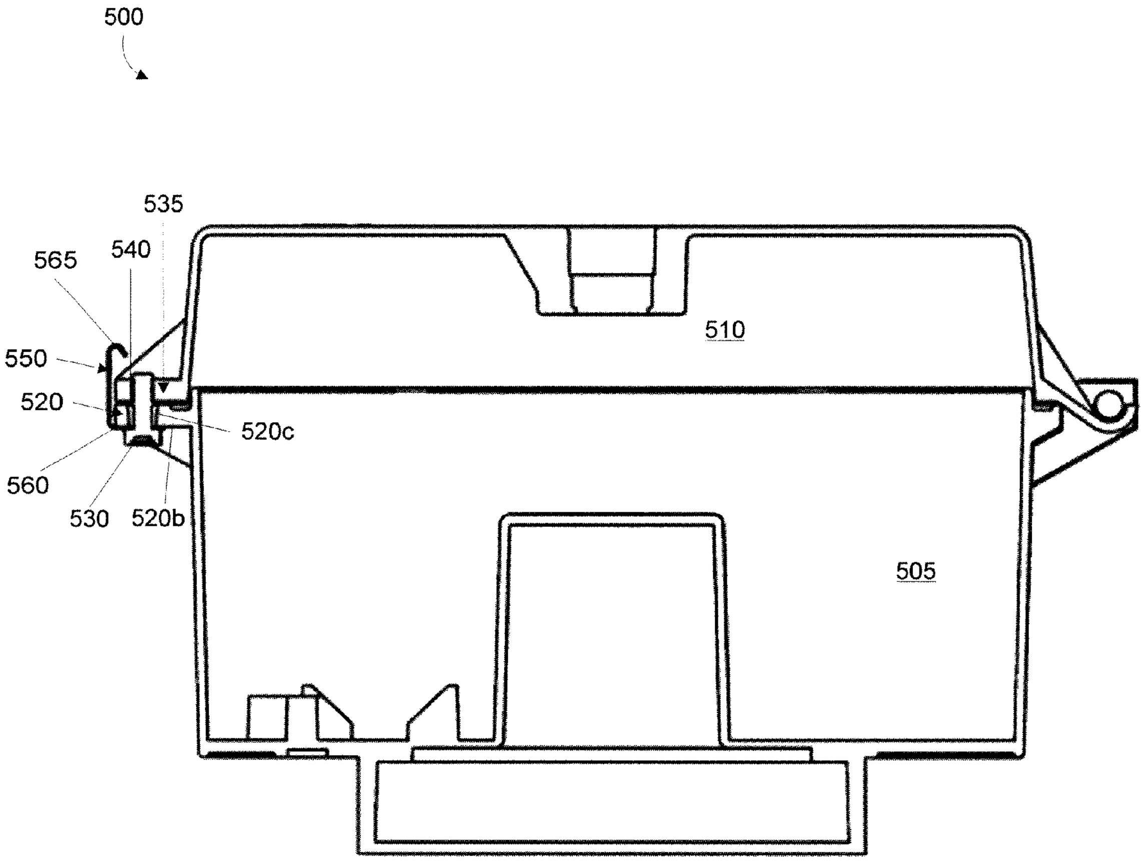
FIG. 5C is a side cross-sectional view of the support clip coupled to the ballast tank housing and the top hat of FIG. 5A, and the ballast tank housing secured to the top hat by a locking screw, according to an exemplary embodiment.

The lower flange 110 comprises an aperture 110*a* through which a locking screw 530 (FIGS. 5A-5C) is received. In certain exemplary embodiments, the aperture 110*a* is centrally positioned on the lower flange 110. The lower flange 110 also comprises two apertures 110*b* to receive fasteners (not shown), such as screws or nails, to secure the lower flange 110 to a ballast housing 505 (FIGS. 5A-5C). In certain embodiments, the apertures 110*a*, 110*b* are aligned linearly on the lower flange 110, and the aperture 110*a* is positioned between each of the apertures 110*b*. In certain alternative embodiments, the lower flange 110 includes four apertures 110*b*, each positioned generally in one corner of the lower flange 110. In certain alternative embodiments, the lower flange 110 may not include any apertures 110*b*, and the lower flange 110 may be secured to the ballast housing 505 by an epoxy, or other adhesive. In certain embodiments, the lower flange 110 may be welded to the ballast housing 505. In certain embodiments, the lower flange 110 may be secured to the ballast housing 505 by a rivet, or other mechanical fastener. One having ordinary skill in the art will recognize that the lower flange 110 may be secured to the ballast housing 505 in any number of ways.

Figure 1B:
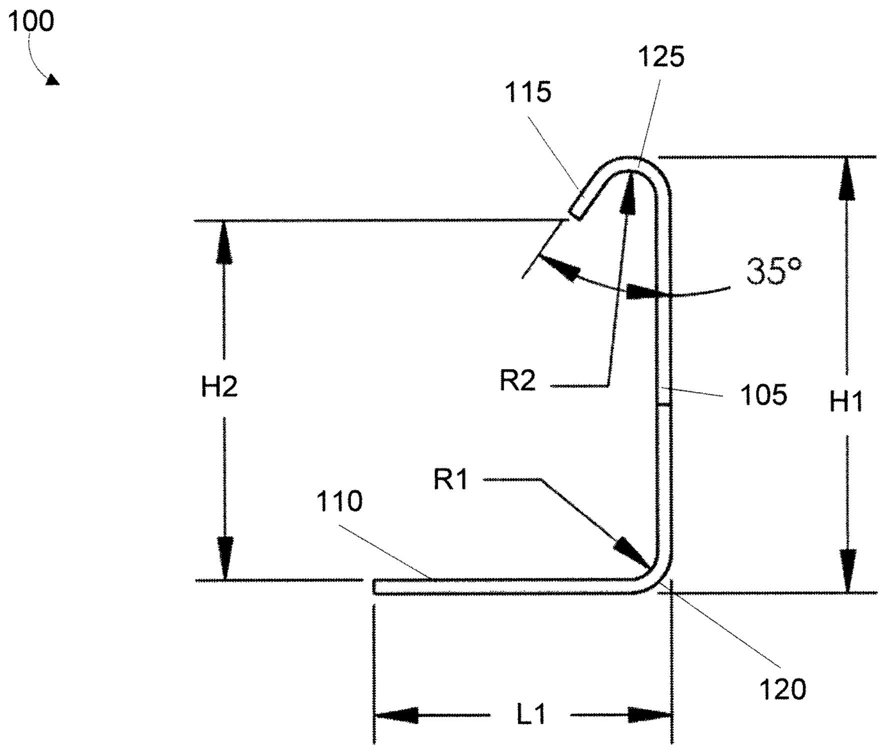
FIG. 1B is a side view of the support clip of FIG. 1A, indicating exemplary dimensions of the support clip.

FIG. 1B is a side view of the support clip 100, indicating exemplary dimensions of the support clip 100. As illustrated, the lower flange 110 extends perpendicularly from the web 105. Intersection 120 of the web 105 and the lower flange 110 has a radius of curvature R1, which is about 1.5 millimeters (0.06 inch) in the exemplary embodiment. In certain alternative embodiments, the intersection 120 of the web 105 and the lower flange 110 may be perpendicular (without a radius of curvature), stepped, or recessed for added strength and/or rigidity.

In the illustrated embodiment, the upper flange 115 extends at an angle of about 35 degrees from the web 105 and towards the lower flange 110. In certain alternative exemplary embodiments, the angle between the upper flange 115 and the web 105 can be any suitable angle that allows the upper flange 115 to securely engage a mounting module, such as a top hat 510 (FIG. 5A). For example, the angle can be in a range of about 5 degrees to less than about 90 degrees. In certain exemplary embodiments, the angle is in a range of about 15 degrees to about 60 degrees. In another specific exemplary embodiment, the angle is about 30 degrees. In the illustrated embodiment, an intersection 125 of the web 105 and the upper flange 115 has a radius of curvature R2 of about 1.5 millimeters (0.06 inch). In certain alternative embodiments, the intersection 125 of the web 105 and the upper flange 115 may be straight (without a radius of curvature), stepped, or recessed for added strength and/or rigidity.

In the illustrated embodiment, the web 105 has a height H1 of about 24.4 millimeters (0.96 inch). The lower flange 110 has a length L1 of about 16.5 millimeters (0.65 inch). The distance H2 between the lower flange 110 and the upper flange 115 is about 20.1 millimeters (0.79 inch). Other dimensions are suitable and can be chosen based on the particular ballast tank housing and mounting module for which the support clip 100 is designed.

Figure 1C:
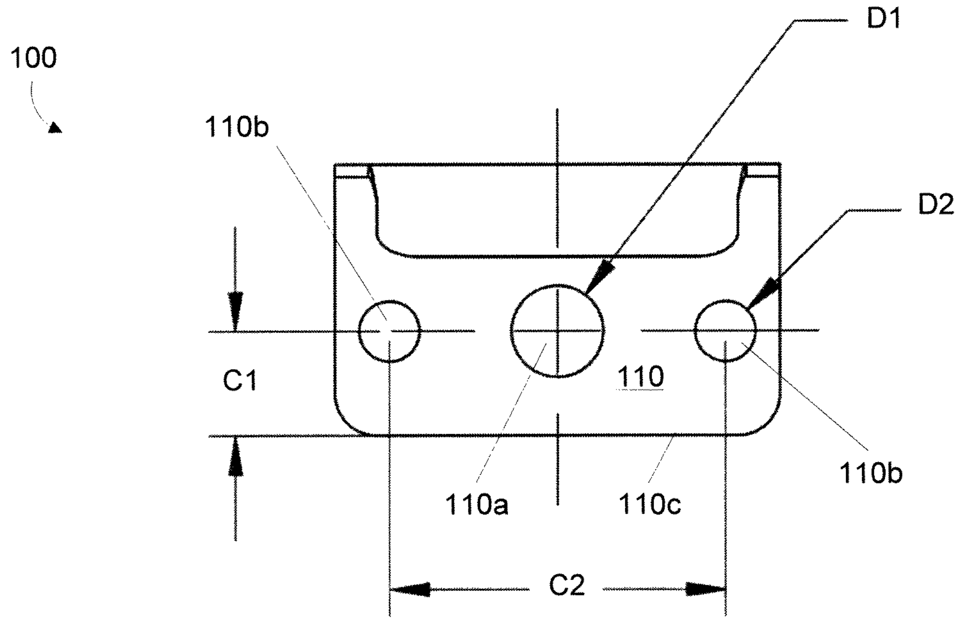
FIG. 1C is a top view of the support clip of FIG. 1A, indicating exemplary dimensions of the support clip.

FIG. 1C is a top view of the support clip 100, indicating exemplary dimensions for the support clip 100. The aperture 110*a* has a diameter D1 of about 5.6 millimeters (0.22 inch). In certain alternative embodiments, the aperture 110*a* has a diameter D1 of about 6.9 millimeters (0.27 inch). The apertures 110*b* have a diameter D2 of about 3.6 millimeters (0.14 inch). The apertures 110*a*, 110*b* are positioned on the lower flange 110 such that their centers are separated by distance C1 of about 6.4 millimeters (0.25 inch) from an edge 110*c* of the lower flange 110. The apertures 110*b* are positioned on the lower flange 110 such that their centers are separated by a distance C2 of about 20.3 millimeters (0.80 inch). The diameter and position of the apertures 110*a*, 110*b* can be modified depending on the lighting fixture and fasteners to be used.

Figure 2:
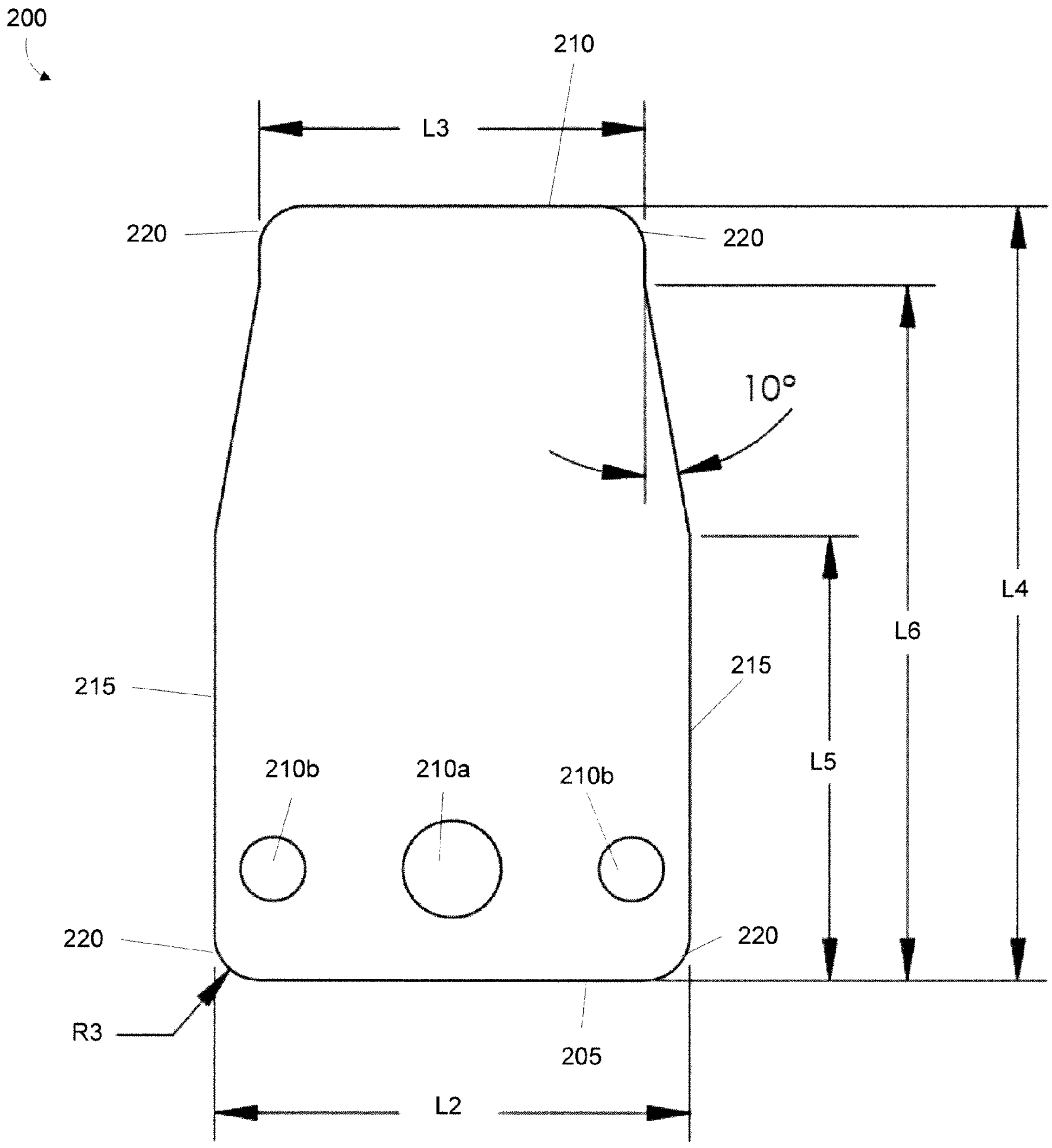
FIG. 2 is a top view of an exemplary blank sheet, prior to being manipulated into a support clip, indicating exemplary dimensions of the blank sheet.

FIG. 2 is a top view of a blank sheet 200 that can be molded into a support clip similar to support clip 100. The blank sheet 200 can be a single sheet fabricated from any suitable material sufficient to support the weight of a ballast tank housing 505 from a top hat 510 (FIGS. 5A-5C). Suitable examples of materials include, but are not limited to, stainless steel, spring metal, plastic, and carbon steel. In certain exemplary embodiments, the blank sheet 200 may be coated with corrosion-resistant finish, such as a zinc phosphate finish or a zinc chromate finish, or an epoxy powder coat paint.

FIG. 2 illustrates representative dimensions for the blank sheet 200, according to an exemplary embodiment. The blank sheet 200 has a thickness of about 0.64 millimeters (0.025 inch). The blank sheet 200 comprises a lower end 205, an upper end 210, and two sides 215. The lower end 205 has a length L2 of about 26.9 millimeters (1.06 inches), the upper end 210 has a length L3 of about 21.8 millimeters (0.86 inch), and the sides 215 have a length L4 of about 44.5 millimeters (1.75 inches). Each intersection 220 between the lower end 205 and the sides 215, and the upper end 210 and the sides 215 has a radius of curvature R3 of about 2.5 millimeters (0.10 inch). The blank sheet 200 also includes apertures 210*a*, 210*b*, similar to apertures 110*a*, 110*b* (FIGS. 1A, 1C). In certain exemplary embodiments, the upper end 210 is smooth. In certain alternative embodiments, the upper end 210 can include serrations 440 (FIG. 4), or other gripping means, for securing a support clip of the present invention to an extension 535 of top hat 510 (FIG. 5B).

At a distance L5 of about 1.00 in from the lower end 205 towards the upper end 210, the sides 215 taper inwardly at an angle of about 10 degrees. At a distance L6 of about 39.9 millimeters (1.57 inches) from the lower end 205 towards the upper end 210, the sides 215 cease angling and continue perpendicular from that point to the upper end 210.

Figure 3A:
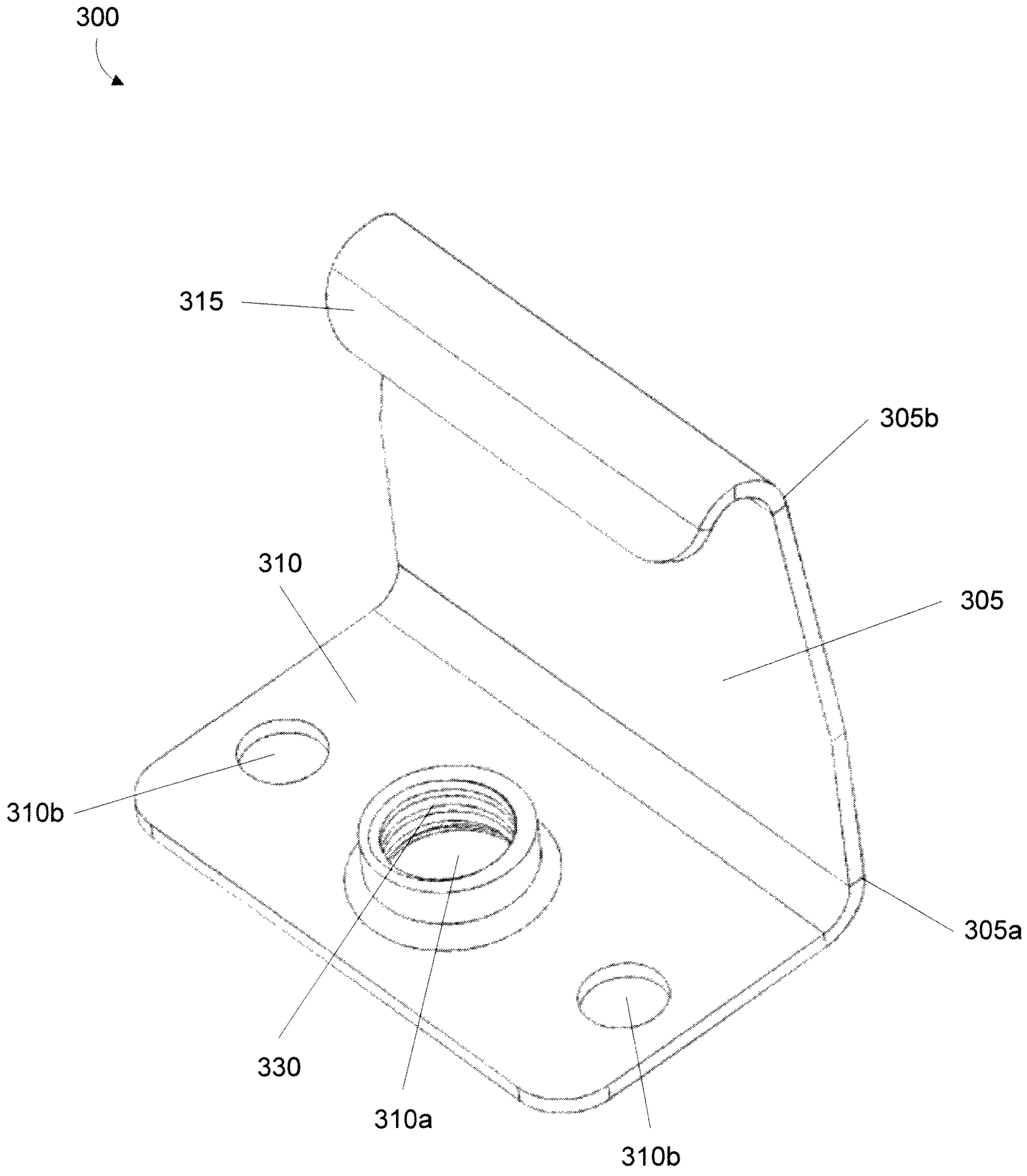
FIG. 3A is a top perspective view of another support clip, according to an exemplary embodiment.
Figure 3B:
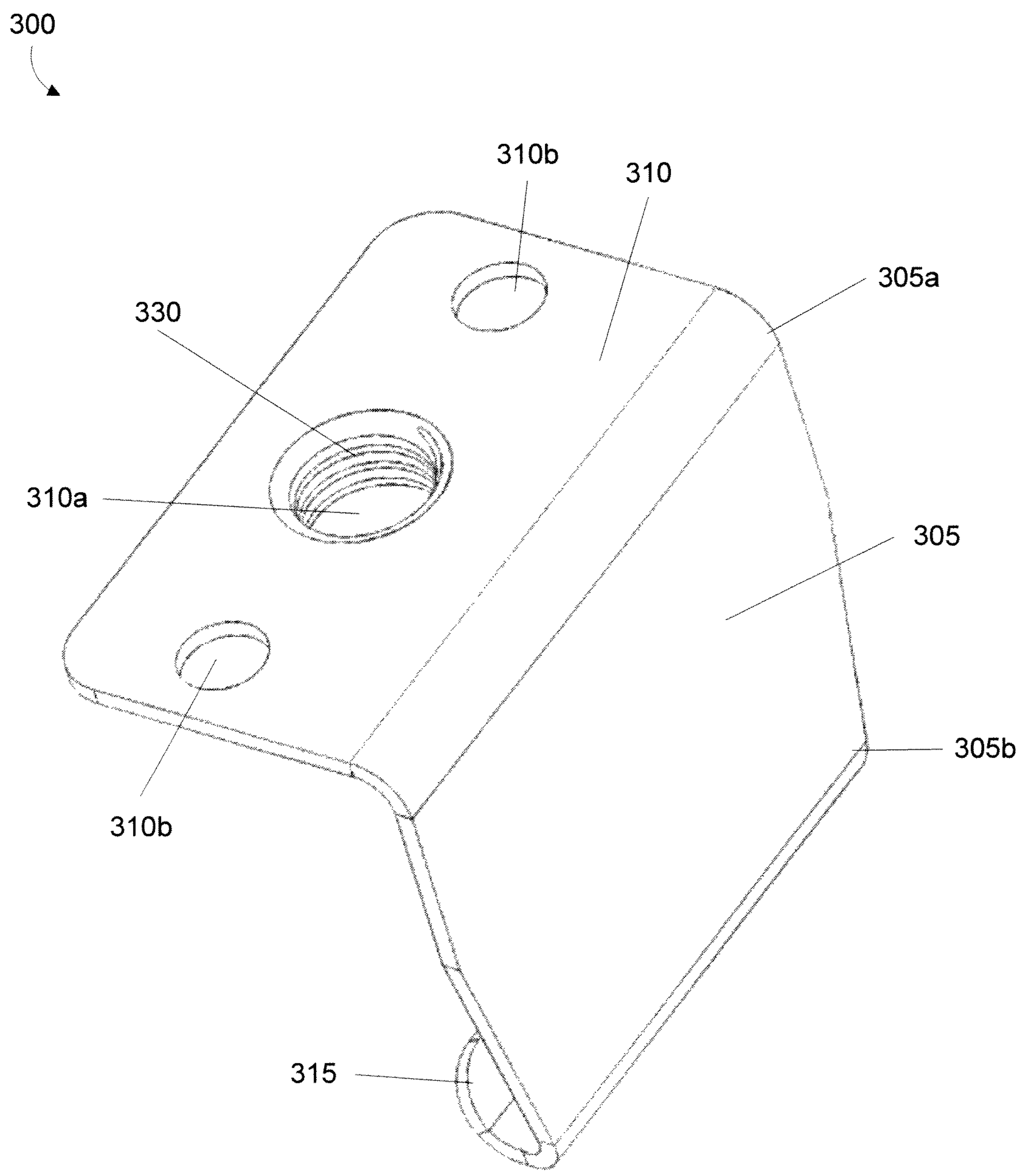
FIG. 3B is a bottom perspective view of the support clip of FIG. 3A, according to an exemplary embodiment.

FIGS. 3A and 3B are top and bottom perspective views of a support clip 300, according to an exemplary embodiment of the present invention. The support clip 300 is similar to the support clip 100, with the difference being in the aperture 110*a*. The support clip 300 comprises a web 305, a lower flange 310, and an upper flange 315. The lower flange 310 extends from a lower end 305*a* of the web 305. The upper flange 315 extends from an upper end 305*b* of the web 305, where the upper end 305*b* is opposite the lower end 305*a*.

The lower flange 310 comprises a cylindrical-shaped aperture 310*a* that extends from the lower flange 310 towards the upper flange 315. In certain alternative embodiments, the aperture 310*a* may be positioned entirely within the lower flange 310. In certain alternative embodiments, the aperture 310*a* may be cylindrical-shaped and extend from the lower flange 310 in a direction away from the upper flange 315. In certain alternative embodiments, the aperture 310*a* may be cylindrical-shaped and extend from the lower flange 310 in both direction away from the lower flange 310.

The support clip 300 includes threads 330 disposed within the interior of the aperture 310*a*. The threads 330 are configured to mate with corresponding threads on a locking screw (not shown). In certain exemplary embodiments, the aperture 310*a* is centrally positioned on the lower flange 310. The lower flange 310 also comprises two apertures 310*b* to receive fasteners (not shown) to secure the lower flange 310 to a ballast housing 505 (FIGS. 5A-5C). In certain embodiments, the apertures 310*a*, 310*b* are aligned linearly on the lower flange 310, and the aperture 310*a* is positioned between each of the apertures 310*b*.

Figure 4:
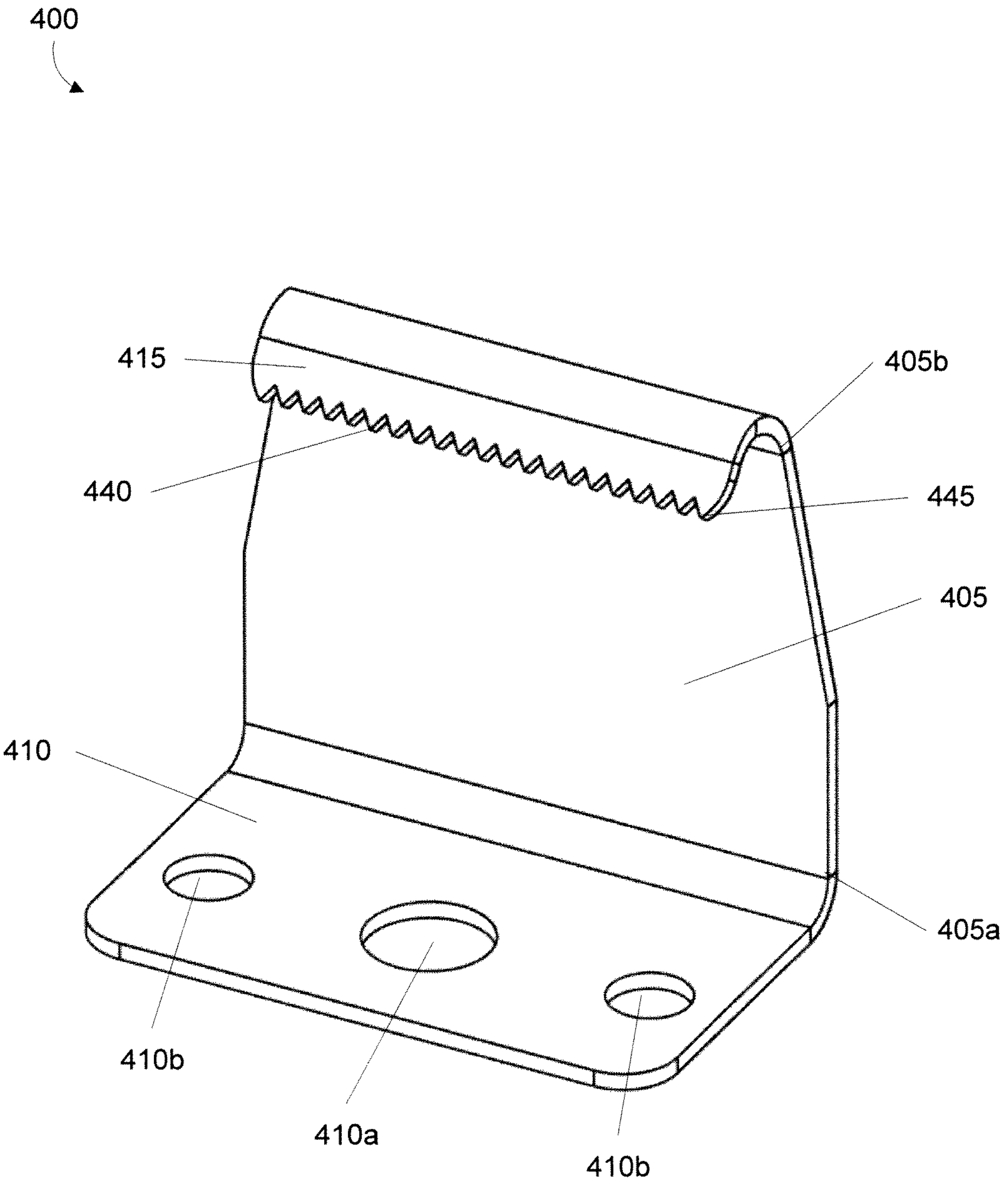
FIG. 4 is a top perspective view of yet another support clip, according to an exemplary embodiment

FIG. 4 is a top perspective view of a support clip 400, according to an exemplary embodiment of the present invention. The support clip 400 is similar to the support clip 100, with the difference being in the presence of a gripping means on the support clip 400. The support clip 400 comprises a web 405, a lower flange 410, and an upper flange 415. The lower flange 410 extends from a lower end 405*a* of the web 405. The upper flange 415 extends from an upper end 405*b* of the web 405, where the upper end 405*b* is opposite the lower end 405*a*. The upper flange 415 comprises a gripping means, such as serrations 440, at an end 445 thereof, for securing the support clip 400 to a mounting module, such as an extension 535 of top hat 510 (FIG. 5B).

The lower flange 410 comprises an aperture 410*a* through which a locking screw 530 (FIGS. 5A-5C) is received. In certain exemplary embodiments, the aperture 410*a* is centrally positioned on the lower flange 410. The lower flange 410 also comprises two apertures 410*b* to receive fasteners (not shown), such as screws or nails, to secure the lower flange 410 to a ballast housing 505 (FIGS. 5A-5C). In certain exemplary embodiments, the apertures 410*a*, 410*b* are aligned linearly on the lower flange 410, and the aperture 410*a* is positioned between each of the apertures 410*b*.

FIG. 5A is a perspective view of a lighting fixture 500 having a cylindrical ballast tank housing 505 coupled at one end to a cylindrical top hat 510 by a hinge 515, according to an exemplary embodiment. The housing 505 is configured to house the internal components, such as a ballast (not shown), of the lighting fixture 500. The top hat 510 is adapted to be coupled to a ceiling, wall, pole, or other suitable structure (not shown).

The housing 505 comprises a rectangular-shaped extension 520 secured to the housing 505 by two triangular-shaped support members 520*a*. In certain alternative embodiments, the rectangular-shaped extension 520 is fixed to a side of the housing 505 without support members 520*a*. The rectangular-shaped extension 520 includes a lower flat surface 520*b* (FIGS. 5B-5C) to which a lower flange 560 of a support clip 550 is secured. The support clip 550 can be coupled in a fixed position to the extension 520 with fasteners (not shown) through apertures (not shown) in the lower flange 560, or by an adhesive.

A locking screw 530 extends through a center aperture (not shown) on the lower flange 560 and through a corresponding aperture 520*c* (FIGS. 5B-5C) in the extension 520. An optional retainer (not shown), such as a thin, loosely fitting washer, secures the locking screw 530 in the center aperture and the corresponding aperture in the extension 520. The retainer is positioned on an end of the locking screw 530 opposite to the head of the locking screw 530. The locking screw 530 can be a screw, a bolt, or other suitable fastener.

The top hat 510 comprises an extension 535 having a rectangular shape corresponding to the shape of the extension 520 of the ballast tank housing 505. The extension 535 includes a threaded aperture 540 that aligns with the aperture 520*c* in the extension 520, and receives the locking screw 530, when the housing 505 is being secured to the top hat 510.

FIG. 5B is a side cross-sectional view of the lighting fixture 500 with the ballast tank housing 505 placed into a latched position with the top hat 510. To latch the housing 505 to the top hat 510, a user uses one, or both, hands to support and shift the housing 505 towards the top hat 510. As the housing 505 shifts towards the top hat 510, an upper flange 565 of the support clip 550 contacts the end of the extension 535. The support clip 550 has a certain degree of flexibility that allows the extension 535 to bend the upper flange 565 away from the top hat 510 upon contacting the extension 535, towards a web 555 of the support clip 550, as the housing 505 moves towards the top hat 510. Once the end of the upper flange 565 is above the top hat 510, the upper flange 565 flexes back towards the top hat 510. The upper flange 565 of the support clip 550 then latches to a top portion of the extension 535 of the top hat 510 and holds the housing 505 in place. As a result, the user does not have to support the housing 505 with a hand while attempting to secure the locking screw 530. The upper flange 565 retains its shape and the support clip 550 supports the housing 505. At this stage, the user can begin fastening the locking screw 530 to the extension 535 of the top hat 510 using one hand.

FIG. 5C is a side cross-sectional view of the lighting fixture 500 with the ballast tank housing 505 securely fastened to the top hat 510. The locking screw 530 has been threadably engaged into the aperture 540 of the top hat 510 to pull the housing 505 toward the top hat 510. The locking screw 530 extends from the extension 520 of the housing 505 to the aperture 540 in the extension 535 of the top hat 510 and secures the housing 505 in place. At this stage, the upper flange 565 of the support clip 550 releases the top portion of the extension 535 of the top hat 510.

Locking assemblies utilizing the support clips of the present invention for coupling the ballast tank housing 505 to the top hat 510 can quickly clip the housing 505 to the top hat 510 to hold those components relative to each other, thereby allowing the user to operate the locking screw 530 without separately holding those components together. Accordingly, the support clips of the present invention can eliminate the need for using two hands to support and secure the housing 505 to the top hat 510. Furthermore, the support clips of the present invention can allow the lighting fixture to be left in a latched state and prevent the ballast housing 505 from swinging fully open in the event that a maintenance person needs to step away for any reason.

To facilitate a better understanding of the present invention, the following, non-limiting example of certain aspects of the invention is provided.

EXAMPLE

Multiple support clips having the dimensions described with respect to FIGS. 1A-1C, and 2 were constructed. The support clips have a thickness of 0.64 millimeters (0.025 inch) and were fabricated from 301 tempered spring stainless steel.

A support clip was assembled to each of four VMV Series Champ™ luminaire ballast housings ("VMV") commercially available from Cooper Technologies Company, Houston, Tex. The VMV has a weight of 5.9 kilograms (13 pounds).

A support clip was assembled to each of four DMV Series Champ™ luminaire ballast housings ("DMV") commercially available from Cooper Technologies Company, Houston, Tex. The DMV has a weight of 11.8 kilograms (26 pounds).

A support clip was assembled to each of four LMV Series Champ™ luminaire ballast housings ("LMV") commercially available from Cooper Technologies Company, Houston, Tex. The LMV has a weight of 4.5 kilograms (10 pounds).

A support clip was assembled to each of four high-wattage VMV Series Champ™ luminaire ballast housings ("high-wattage VMV") commercially available from Cooper Technologies Company, Houston, Tex. The high-wattage VMV has a weight of 17.7 kilograms (39 pounds).

Each of the ballast housings were tested with one of four top hats. The top hats included the APM3 pendant mount, the CM3 ceiling mount, the TWM3 wall mount, and the JM5 angled stanchion mount, all commercially available from Cooper Technologies Company, Houston, Tex. Each of the top hats were modified by adding a 1.5 millimeters (0.06 inch)×45 degrees chamber to the leading edge of the locking screw hole.

Assembly Test

Each of ballast housings were assembled to each type of top hat to verify that the support clips would hold each combination and that the locking screw would assemble properly. Each combination was cycled, or opened and closed, at least 10 times.

The support clips were found to allow assembly of all of the ballast housings to all of the types of top hats.

Endurance Test

The high-wattage VMV was mounted to the TWM3 wall mount top hat and the combination was cycled 100 times.

The combination continued to operate and there was no damage to the support clip.

Pull Test

The LMV was mounted to a CM3 ceiling mount top hat on a SATEC™ Universal Load Machine (Model No. 60BTE, Serial No. 69550, Range 0-2400 pounds). The load was gradually increased until the assembly came apart. The test was repeated four times.

The maximum pull load was observed between 59.9 kilograms (132 pounds) and 64.0 kilograms (141 pounds), as described in Table 1 below.

TABLE 1

| Test | Maximum Load (kilograms) | Maximum Load (pounds) |
|---|---|---|
| 1 | 59.9 | 132 |
| 2 | 61.2 | 135 |
| 3 | 61.2 | 135 |
| 4 | 64.0 | 141 |

Thus, the Example illustrates that the support clips of the present invention can allow assembly of various types of ballast housings to various types of mounting modules, can withstand use over time, and can have a maximum pull load of greater than 59.0 kilograms (130 pounds).

Therefore, the present invention is well adapted to attain the ends and advantages mentioned as well as those that are inherent therein. The particular embodiments disclosed above are exemplary only, as the present invention may be modified and practiced in different but equivalent manners apparent to those having ordinary skill in the art and having the benefit of the teachings herein. For example, one having ordinary skill in the art may recognize that the support clip may be any suitable size or shape to accommodate various ballast tank housings and top hats. The physical composition of the support clip also may vary in alternative embodiments as long as the material is sufficient to support the housing to the top hat. In addition, the position of the apertures in the lower flange of the support clip can be varied to accommodate various housings. Also, while the use of a locking screw is described in conjunction with the support bracket of the present invention, alternative fasteners may be utilized with the support clip to secure the housing to the top hat. Furthermore, the angle of the upper flange of the support clip from the web can be varied to accommodate various top hats. It is therefore evident that the particular illustrative embodiments disclosed above may be altered or modified and all such variations are considered within the scope and spirit of the present invention.

What is claimed is:

1. A support clip comprising:

a web having an upper end and a lower end;

a lower flange extending from the lower end of the web;

a first aperture positioned in the lower flange and having a first size;

at least one second aperture positioned in the lower flange adjacent to the first aperture and having a second size; and an upper flange extending from the upper end of the web, wherein the upper flange extends at an angle towards the lower flange, wherein the upper flange is configured to engage a mounting module extension of a lighting fixture;

wherein the first aperture receives a removable locking screw for securing a housing of a lighting fixture to the mounting module of the lighting fixture, and wherein the at least one second aperture receives at least one fastener for securing the lower flange to the housing of the lighting fixture.

2. The support clip of claim 1, wherein the lower flange extends orthogonally from the web.

3. The support clip of claim 1, wherein an intersection between the lower flange and the web is radially curved, stepped, or recessed.

4. The support clip of claim 1, wherein an intersection between the upper flange and the web is radially curved, stepped, or recessed.

5. The support clip of claim 1, wherein the first aperture comprises threads disposed along an interior thereof.

6. The support clip of claim 1, wherein the angle is in the range from about 15 degrees to about 60 degrees between the upper flange and the web.

7. The support clip of claim 1, wherein the upper flange comprises gripping means.

8. A lighting fixture comprising:

a housing of the lighting fixture having a first extension, the first extension having a first opening;

a mounting module of the lighting fixture detachably coupled to the housing and having a second extension, wherein the second extension comprises a second opening aligned with the first opening when the mounting module is mechanically coupled to the housing;

a locking screw disposed within the first opening in the first extension of the housing and the second opening in the second extension of the mounting module to mechanically couple the mounting module to the housing; and a support clip mechanically coupled to the housing and the mounting module of the lighting fixture when the mounting module is mechanically coupled to the housing, wherein the support clip comprises:

a web having an upper end and a lower end;

a lower flange extending from the lower end of the web and coupled to the first extension;

a first aperture positioned in the lower flange and having a first size, wherein the first aperture is aligned with the first opening;

at least one second aperture positioned in the lower flange adjacent to the first aperture and having a second size; and an upper flange extending from the upper end of the web and coupled to the second extension of the mounting module of the lighting fixture, wherein the upper flange extends at an angle towards the lower flange, wherein the first aperture receives the locking screw, and wherein the at least one second aperture receives at least one fastener for securing the support clip to the housing.

9. The lighting fixture of claim 8, wherein the upper flange of the support clip engages the second extension of the mounting module in a latched position.

10. The lighting fixture of claim 8, further comprising a fastener, wherein in a locked position, the fastener is positioned within the first aperture of the support clip, the first opening, and the second opening, wherein the upper flange of the support clip disengages the second extension of the mounting module in the locked position.

11. The lighting fixture of claim 8, further comprising a fastener positioned within the first aperture of the support clip, the first opening, and the second opening in a locked position.

12. The lighting fixture of claim 11, wherein the upper flange of the support clip disengages the second extension of the mounting module in the locked position.

13. The lighting fixture of claim 11, wherein the fastener is threaded, and the first aperture of the support clip comprises corresponding mating threads disposed along an interior thereof.

14. The lighting fixture of claim 8, wherein the lower flange extends orthogonally from the web.

15. The lighting fixture of claim 8, wherein an intersection between the lower flange and the web is radially curved, stepped, or recessed.

16. The lighting fixture of claim 8, wherein an intersection between the upper flange and the web is radially curved, stepped, or recessed.

17. The lighting fixture of claim 8, wherein the angle is in the range from about 15 degrees to about 60 degrees between the upper flange and the web.

18. The lighting fixture of claim 8, wherein the upper flange comprises gripping means.

19. A lighting fixture comprising:

a housing of the lighting fixture having an extension, the extension having a first aperture and at least one second aperture extending therethrough; and a support clip mechanically coupled to the housing of the lighting fixture, wherein the support clip comprises:

a web having an upper end and a lower end;

a lower flange extending from the lower end of the web and coupled to the extension;

a third aperture positioned in the lower flange and aligned with the first aperture;

at least one fourth aperture positioned in the lower flange adjacent to the third aperture, wherein the at least one fourth aperture aligns with the at least one second aperture; and an upper flange extending from the upper end of the web, wherein the upper flange extends at an angle towards the lower flange and engages a mounting module of the lighting fixture, wherein the first aperture and the third aperture receive a locking screw, wherein the locking screw is removably disposed in the first aperture and the third aperture when the mounting module is mechanically coupled to the housing of the lighting fixture, and wherein the at least one second aperture and the at least one fourth aperture receive at least one fastener for securing the support clip to the housing.

20. The lighting fixture of claim 19, wherein the lower flange abuts against an outer surface of the extension.

* * * * *